(12) United States Patent
Kim

(10) Patent No.: US 10,946,846 B2
(45) Date of Patent: Mar. 16, 2021

(54) ELECTRIC BRAKE SYSTEM AND CONTROL METHOD THEREOF

(71) Applicant: MANDO CORPORATION, Gyeonggi-do (KR)

(72) Inventor: Sanghoon Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 103 days.

(21) Appl. No.: 16/425,885

(22) Filed: May 29, 2019

(65) Prior Publication Data
US 2019/0366994 A1 Dec. 5, 2019

(30) Foreign Application Priority Data

May 30, 2018 (KR) .................. 10-2018-0061702

(51) Int. Cl.
*B60T 8/94* (2006.01)
*B60T 7/04* (2006.01)
*B60T 8/40* (2006.01)

(52) U.S. Cl.
CPC ............... *B60T 8/94* (2013.01); *B60T 7/042* (2013.01); *B60T 8/4086* (2013.01); *B60T 2270/404* (2013.01); *B60T 2270/82* (2013.01)

(58) Field of Classification Search
CPC ..... B60T 8/92; B60T 8/88; B60T 8/94; B60T 8/4086; B60T 2270/404; B60T 2270/82; B60T 2270/40
See application file for complete search history.

(56) References Cited

U.S. PATENT DOCUMENTS

| | | | |
|---|---|---|---|
| 6,349,806 B1* | 2/2002 | Takayama | B60T 7/042 188/345 |
| 2012/0158266 A1* | 6/2012 | Miyazaki | B60W 30/18109 701/70 |
| 2014/0008965 A1* | 1/2014 | Ito | B60T 13/58 303/3 |

(Continued)

FOREIGN PATENT DOCUMENTS

| | | |
|---|---|---|
| EP | 2 520 473 | 11/2012 |
| KR | 10-2014-0077033 | 6/2014 |

(Continued)

*Primary Examiner* — Melanie Torres Williams
(74) *Attorney, Agent, or Firm* — Ladas & Parry, LLP

(57) ABSTRACT

Disclosed herein is an electronic brake system and a method for controlling the same are disclosed. The electronic brake system includes a master cylinder for discharging oil according to displacement of a brake pedal, a pedal displacement sensor sensing brake pedal displacement, a simulation apparatus providing pedal pressure responsive to the sensed pedal displacement, a hydraulic pressure supply unit for generating hydraulic pressure using a motor that operates based on the sensed pedal displacement, a hydraulic circuit for supplying the hydraulic pressure generated from the hydraulic pressure supply unit to the caliper, a cut valve positioned between the master cylinder and the hydraulic circuit for transmitting or blocking the hydraulic pressure discharged from the master cylinder, and a controller for blocking at least one of the cut valve and braking control with a target pressure according to a pressure in the simulation apparatus when the simulation apparatus fails.

15 Claims, 6 Drawing Sheets

(56) References Cited

U.S. PATENT DOCUMENTS

| | | | |
|---|---|---|---|
| 2016/0185332 A1* | 6/2016 | Jeon | B60T 8/4081 |
| | | | 303/9.61 |
| 2017/0015290 A1* | 1/2017 | Oosawa | B60T 13/146 |
| 2017/0166176 A1* | 6/2017 | Yang | B60T 7/085 |
| 2018/0162340 A1* | 6/2018 | Irwan | B60T 13/686 |
| 2018/0178772 A1* | 6/2018 | Foitzik | B60T 13/686 |
| 2018/0339688 A1* | 11/2018 | Takahashi | B60T 11/20 |

FOREIGN PATENT DOCUMENTS

| | | |
|---|---|---|
| KR | 10-2015-0021629 | 3/2015 |
| KR | 10-2015-0061210 | 6/2015 |

* cited by examiner

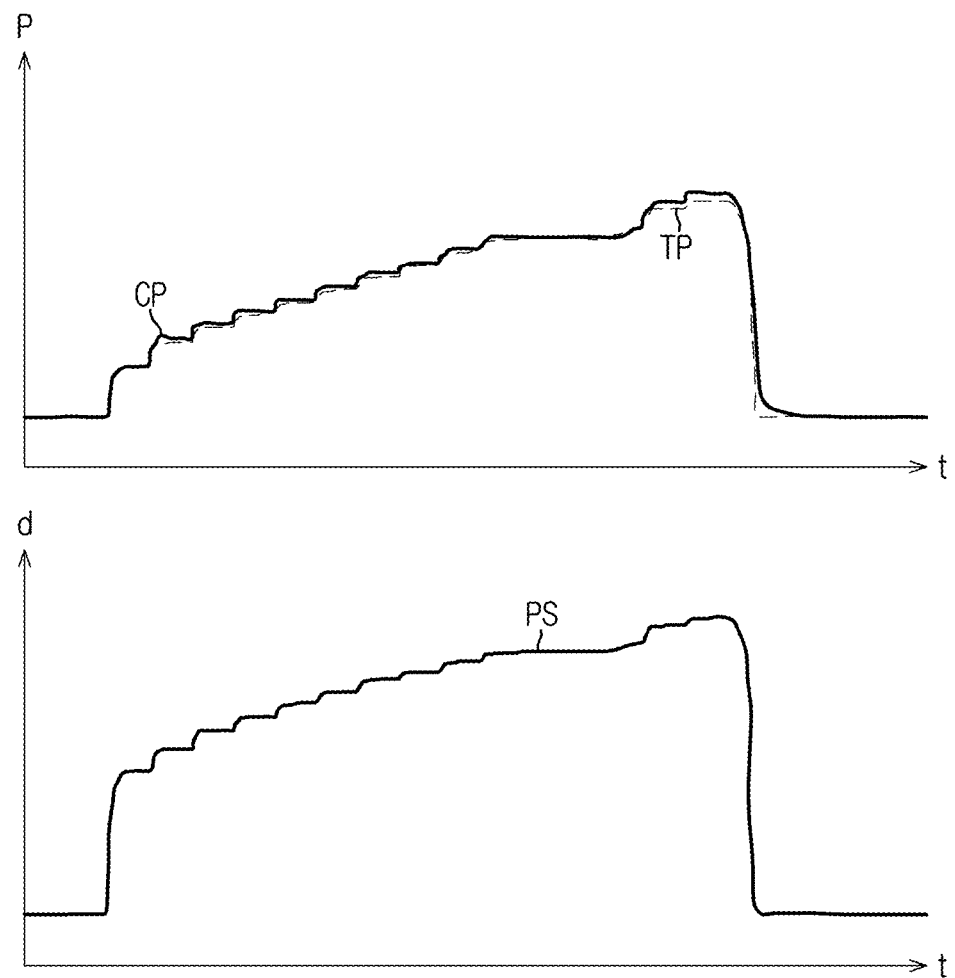

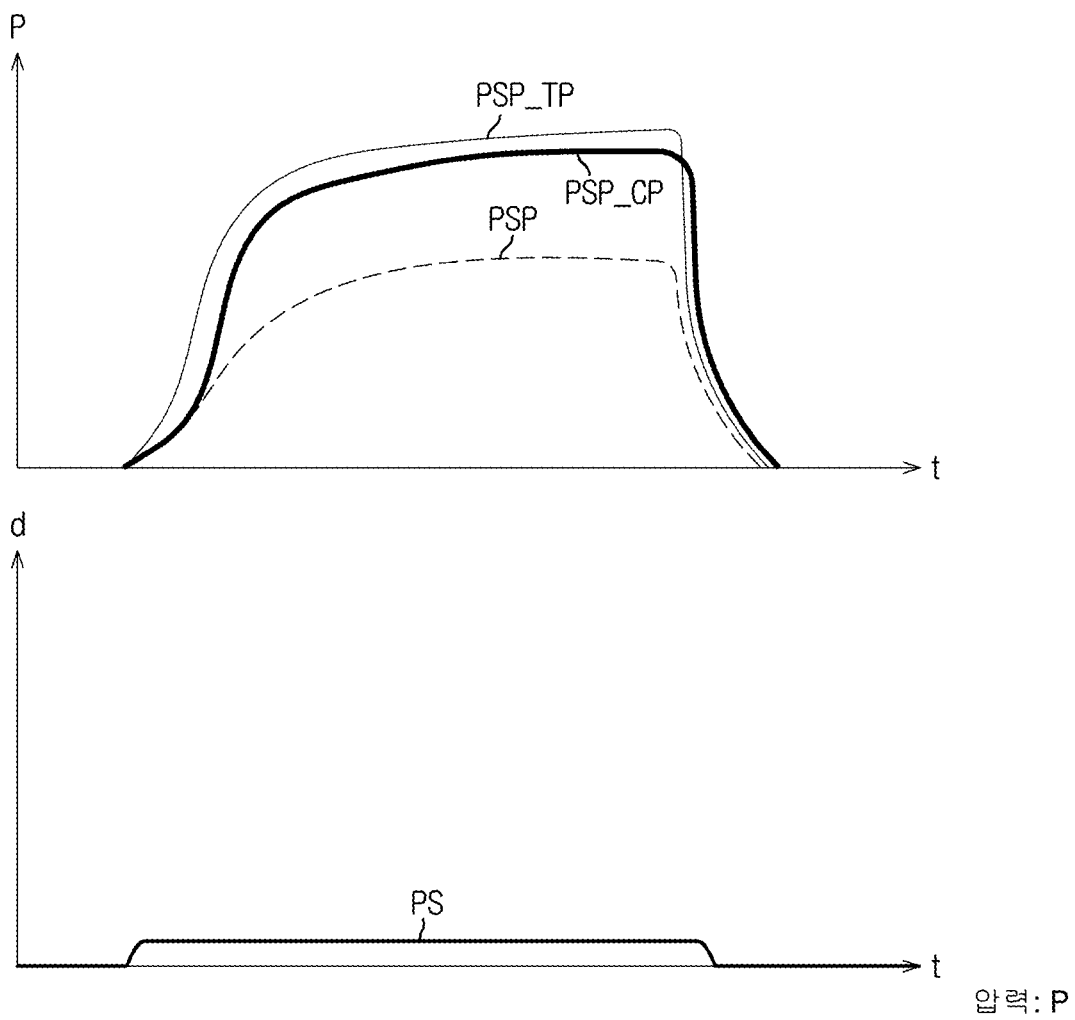

ELECTRIC BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2018-0061702, filed on May 30, 2018 in the Korean Intellectual Property Office, the disclosure of which is incorporated by reference in its entirety.

BACKGROUND

1. Field

Embodiments of the present disclosure relate to an electronic brake system, and more particularly to an electronic brake system and method for controlling thereof when a pedal simulator in the electronic brake system fails.

2. Description of the Related Art

In general, a vehicle is essentially equipped with a brake system for braking, and in recent years, various types of brake systems have been proposed to obtain a more powerful and stable braking force.

Examples of brake systems include anti-lock brake systems (ABSs) to prevent wheels from sliding during braking, brake traction control systems (BTCSs) to prevent driving wheels from sliding when a vehicle performs a sudden unintended acceleration or when a vehicle is intentionally accelerated, and electronic stability control systems (ESCs) to stably maintain a driving state of vehicles by controlling brake hydraulic pressure through combination of an anti-lock brake system with a brake traction control system.

Generally, an electronic brake system includes a hydraulic-pressure supply device. Once a driver depresses a brake pedal, the hydraulic-pressure supply device senses displacement of the pedal through a pedal displacement sensor, receives an electric signal indicating the driver's braking intention from the pedal displacement sensor, and supplies pressure to a wheel cylinder.

An electronic brake system provided with such an actuator has been disclosed in European Registered Patent No. EP 2 520 473. According to this European Patent document, the actuator is configured such that a motor is activated according to a pedal effort of a brake pedal to generate braking pressure. At this point, the braking pressure is generated by converting a rotational force of the motor into a rectilinear movement to pressurize a piston.

The brake system also includes a pedal simulator that provides the driver with a pedal feeling in response to the pedal pressure applied to the driver.

Therefore, the electronic brake system provided with the hydraulic pressure supply unit not only generates the braking pressure based on the sensor value of the pedal displacement sensor acquired for the pedal pressure applied by the driver, but also operates the pedal simulator based on the pedal displacement sensor value.

However, when the pedal simulator valve fails during the pedal simulator operation, the pedal feeling could not be provided to the driver, and resulting in a problem that the braking force of the vehicle could not be generated.

CITED REFERENCE

Patent Document

European Registered Patent No. EP 2 520 473 A1 (Honda Motor Co., Ltd.), (Nov. 7, 2012)

Korean Patent Application Publication No. 10-2015-0061210

SUMMARY

Therefore, it is an aspect of the present disclosure to provide an electronic brake system for generating brake force in response to a driver's braking intention when a pedal simulator valve fails.

In accordance with an aspect of the present disclosure, an electronic brake system includes a master cylinder configured to discharge oil according to displacement of a brake pedal; a pedal displacement sensor configured to sense brake pedal displacement; a simulation apparatus configured to provide pedal pressure responsive to the sensed pedal displacement; a hydraulic pressure supply unit configured to generate hydraulic pressure using a motor that operates based on the sensed pedal displacement; a hydraulic circuit configured to supply the hydraulic pressure generated from the hydraulic pressure supply unit to the caliper; a cut valve positioned between the master cylinder and the hydraulic circuit and configured to transmit or configured to block the hydraulic pressure discharged from the master cylinder; and a controller configured to block at least one of the cut valve and configured to brake control with a target pressure according to pressure in the simulation apparatus when the simulation apparatus fails.

Further, the simulation apparatus may further include a simulation chamber configured to store the oil discharged from the master cylinder; and a simulator valve configured to regulate the hydraulic pressure delivered to the simulation chamber.

Further, the electronic brake system may further include a simulator pressure sensor configured to measure pressure of the simulation apparatus; and the controller may calculate target pressure based on the pressure in the simulation chamber sensed by the simulator pressure sensor and generate hydraulic pressure based on the target pressure when the simulator valve is determined to fail.

Further, the controller may block the cut valve when a failure in the electronic brake system is a failure of the simulator valve.

Further, the controller may enter a fallback mode when it is determined that a failure other than the simulator valve has occurred in the electronic brake system.

Further, the controller may determine that the simulator valve fails when the hydraulic pressure in the simulator chamber is greater than first predetermined hydraulic pressure.

Further, the controller may determine that the simulator valve is not opened when the hydraulic pressure in the simulator chamber is greater than the first predetermined hydraulic pressure.

Further, the controller may periodically open the cut valve after shutting off the cut valve when the simulation apparatus fails.

In accordance with another aspect of the present disclosure, a method for controlling an electronic brake system including a simulation apparatus configured to provide pedal pressure responsive to a pedal displacement, a hydraulic pressure supply unit configured to generate hydraulic pressure using a motor that operates based on the pedal displacement, and a hydraulic circuit configured to provide the hydraulic pressure generated from the hydraulic pressure supply unit to a caliper, the method includes discharging oil according to the displacement of the brake pedal by a master cylinder; transmitting or blocking the hydraulic pressure discharged from the master cylinder, by a cut valve positioned between the master cylinder and the hydraulic circuit; and blocking the cut valve and performing braking control with a target pressure according to a pressure in the simulation apparatus when the simulation apparatus fails.

Further, the method may further include storing oil discharged from the master cylinder by the simulation apparatus; and adjusting the hydraulic pressure transferred to the simulation chamber, by the simulator valve in the simulation apparatus.

Further, the method may further include calculating target pressure based on the hydraulic pressure in the simulation chamber when the simulator valve is determined to fail; and generating hydraulic pressure based on the target pressure.

Further, calculating target pressure based on the hydraulic pressure in the simulation chamber when the simulator valve is determined to fail may include determining that the simulator valve fails when the hydraulic pressure in the simulator chamber is greater than first predetermined hydraulic pressure.

Further, determining the the simulator valve fails when the hydraulic pressure in the simulator chamber is greater than a first determined hydraulic pressure may include determining that the simulator valve is not opened when the hydraulic pressure in the simulator chamber is greater than the first predetermined hydraulic pressure.

Further, the method may further include shutting off the cut valve when a failure in the electronic brake system is a failure of the simulator valve; and entering a fallback mode when it is determined that a failure other than the simulator valve has occurred in the electronic brake system.

Further, the method may further include periodically opening the cut valve after shutting off the cut valve when the simulation apparatus fails.

BRIEF DESCRIPTION OF THE DRAWINGS

These and/or other aspects of the invention will become apparent and more readily appreciated from the following description of the embodiments, taken in conjunction with the accompanying drawings of which:

FIGS. 4B and 4C are graphs illustrating a pedal displacement and simulator pressure, target pressure, and circuit pressure when a simulation apparatus according to an embodiment of the present disclosure fails.

DETAILED DESCRIPTION

Figure 1:
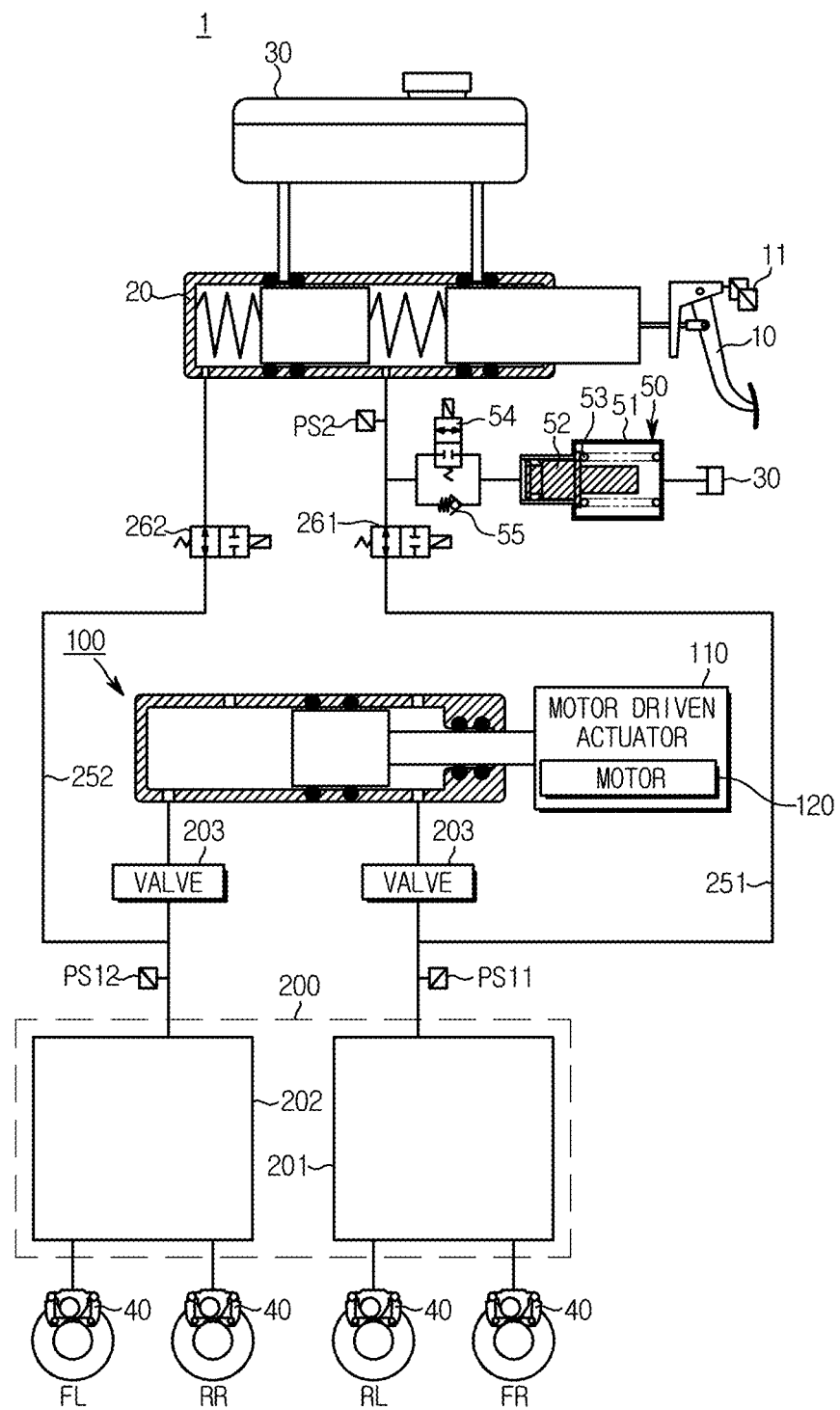
FIG. 1 is a circuit diagram illustrating an electronic brake system according to an embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

FIG. 1 is a circuit diagram illustrating an electronic brake system according to an embodiment of the present disclosure. Referring to FIG. 1, the electronic brake system 1 according to the embodiment may include a reservoir 30 for storing oil by being coupled to an upper portion of a master cylinder 20 a caliper 40 including a wheel cylinder to which hydraulic pressure is transmitted to perform braking of each of wheels RR, RL, FR and FL, a pedal displacement sensor 11 for sensing displacement of a brake pedal 10, and a simulation apparatus 50 for providing a reaction force according to the power of the brake pedal 10.

Referring to FIG. 1, the simulation apparatus 50 includes a pedal simulator that has a simulation chamber 51 provided to store the oil flowing out from the master cylinder 20, a reaction force piston 52 provided in the simulation chamber 51 and a reaction force spring 53 elastically supporting the reaction force piston 52, and a simulator valve 54 connected to a rear portion of the simulation chamber 51.

The reaction force piston 52 and the reaction force spring 53 are installed to have a certain range of displacement in the simulation chamber 51 by the oil introduced into the simulation chamber 51.

The reaction force spring 53 shown in FIG. 1 is merely one embodiment capable of providing an elastic force to the reaction force piston 52 and may include various embodiments capable of storing the elastic force by deforming the shape.

For example, it includes various members capable of storing an elastic force by being made of a material such as rubber or having a coil or a plate shape.

The simulator valve 54 may be provided on a flow path connecting a rear portion of the simulation chamber 51 and the reservoir 30. A front portion of the simulation chamber 51 may be connected to the master cylinder 20 and the rear portion of the simulation chamber 51 may be connected to the reservoir 30 through a simulator valve 54. Therefore, even when the reaction force piston 52 is returned, the oil in the reservoir 30 inflows through the simulator valve 54, so that the entire interior of the simulation chamber 51 may be filled with the oil.

In the meantime, several reservoirs 30 are shown in the figure, and each reservoir 30 uses the same reference numbers. However, these reservoirs may be provided with the same parts or may be provided with different parts. For example, the reservoir 30 connected to the simulation apparatus 50 may be the same as the reservoir 30 connected to the master cylinder 20, and the reservoir 30 may be a reservoir capable of storing oil separately from the reservoir 30 connected to the master cylinder 20.

The simulator valve 54 may be composed of a normally closed type solenoid valve that is normally kept closed. When a driver presses the brake pedal 10, the simulator valve 54 may be opened to deliver the oil in the simulation chamber 51 to the reservoir 30.

A simulator check valve 55 may be installed in parallel with the simulator valve 54 between the pedal simulator and the reservoir 30. The simulator check valve 55 allows the oil of the reservoir 30 to flow into the simulation chamber 51 while preventing the oil of the simulation chamber 51 from flowing to the reservoir 30 through a flow path where the check valve 55 is installed. The simulator check valve 55 may ensure a quick return of the pedal simulator pressure because the oil is supplied to the simulation chamber 51 through the simulator check valve 55 when the brake pedal 10 is released.

The operation of the pedal simulation apparatus 50 is as follows. When a driver depresses the brake pedal 10, the oil in the simulation chamber 51 is transmitted to the reservoir 30 through the simulator valve 54 as the reaction force piston 52 of the pedal simulator pushes the reaction force spring 53, and the driver is provided with a sense of pedaling in this process. On the contrary, when the driver releases the pedal effort applied to the brake pedal 10, the reaction force spring 53 pushes the reaction force piston 52 to be returned to the original state, and the oil in the reservoir 30 may flow into the simulation chamber 51 through the flow path on which the simulator valve 54 is installed and the flow path on which the check valve 55 is installed, so as to fully fill the inside of the simulation chamber 51.

As such, because the inside of the simulation chamber 51 is always filled with oil, the friction of the reaction force piston 52 is minimized during operation of the simulation apparatus 50 so that the durability of the simulation apparatus 50 is improved and the inflow of foreign matter from the outside is blocked.

Figure 3:
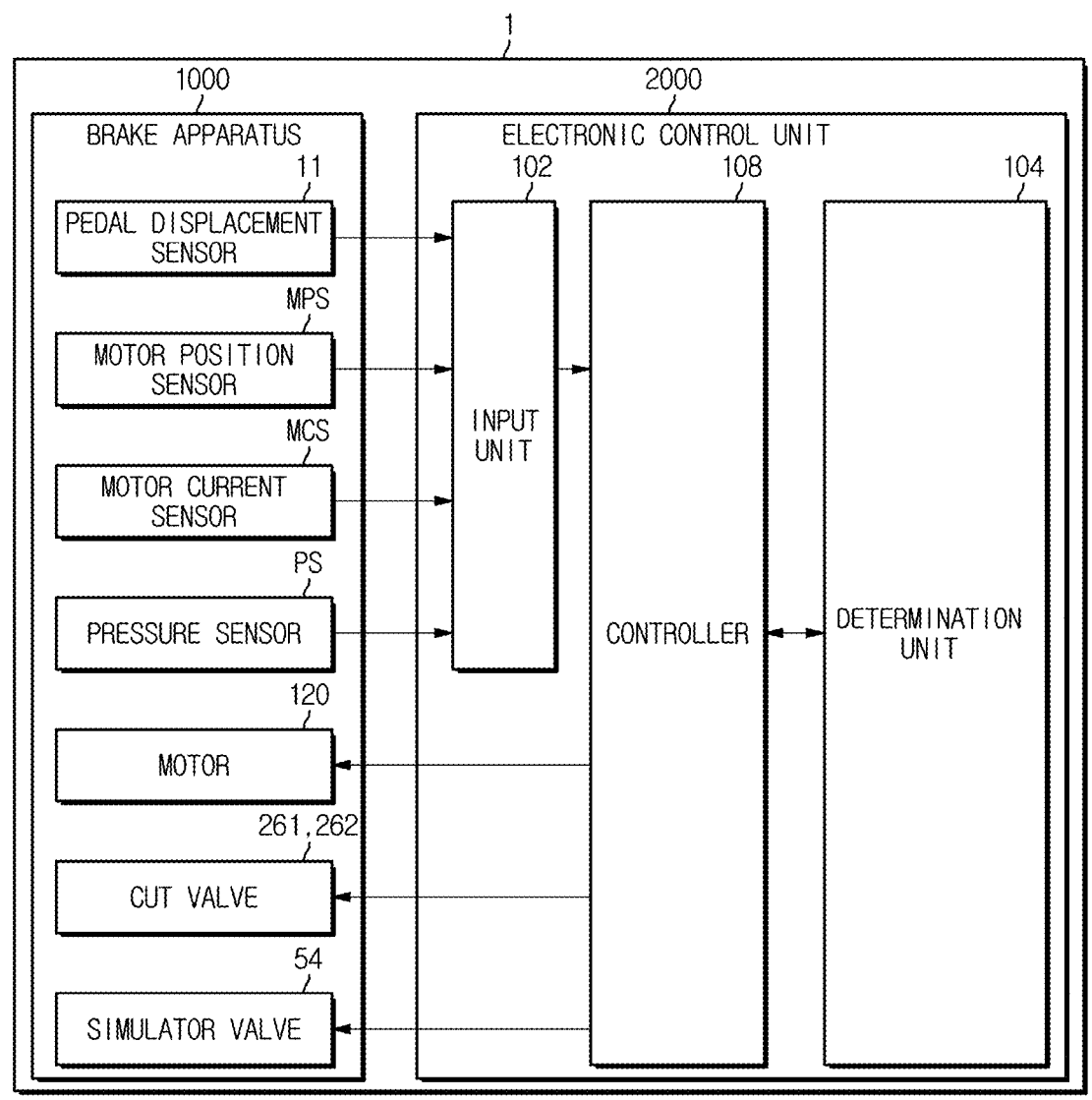
FIG. 3 is an inner block diagram illustrating the electronic brake system according to the embodiment of the present disclosure.

The electronic brake system 1 according to an embodiment of the present disclosure may include a hydraulic pressure supply apparatus 100 which mechanically operates by receiving a driver's braking intention in the form of an electric signal from the pedal displacement sensor 11 which detects the displacement of the brake pedal 10, a hydraulic control unit 200 composed of first and second hydraulic circuits 201 and 202 for controlling the flow of hydraulic pressure transmitted to the caliper 40 including wheel cylinders provided on the two wheels FR and RL or FL and RR, a first cut valve 261 provided on a first backup flow path 251 that connects the master cylinder 20 and the first hydraulic circuit 201 to control the flow of hydraulic pressure, a second cut valve 262 provided on the second backup flow path 252 that connects the master cylinder 20 and the second hydraulic circuit 202 to control the flow of hydraulic pressure, and an electronic control unit (ECU; 2000 in FIG. 3).

The hydraulic pressure supply apparatus 100 may include a motor driven actuator 110 for providing oil pressure delivered to the caliper 40 including the wheel cylinders, and a motor 120 for generating a rotational force by an electrical signal of the pedal displacement sensor 11. The motor 120 converts the rotational motion into a linear motion to move the piston. To describe again the above operations, when a displacement occurs in the brake pedal 10, a signal sensed by the pedal displacement sensor 11 is transmitted to the electronic control unit 2000, and the electronic control unit drives the motor 120 in one direction to move the piston to pass through the valve 203 and generates a hydraulic pressure in the first hydraulic circuit 201 and the second hydraulic circuit 202.

Also, the electronic brake system 1 according to the embodiment of the present disclosure includes the first and second backup flow paths 251 and 252 which can supply the oil transmitted from the master cylinder 20 directly to the wheel cylinder 40 when it is operating abnormally (fallback mode).

The first and second cut valves 261 and 262 for controlling the flow of oil are provided on the first and second backup flow paths 251 and 252, respectively. Also, the first backup flow path 251 connects the master cylinder 20 to the first hydraulic pressure circuit 201 and the second backup flow path 252 connects the master cylinder 20 and the second hydraulic circuit 202 can be connected.

The first and second cut valves 261 and 262 may be provided as normally open type solenoid valves that are opened in a normal state and operate to be closed when receiving a close signal from the electronic control unit.

The hydraulic control unit 200 may include the first hydraulic circuit 201 and the second hydraulic circuit 202, each of which receives hydraulic pressure and controls two wheels, respectively. For example, the first hydraulic circuit 201 may control the front right wheel FR and the rear left wheel RL, and the second hydraulic circuit 202 may control the front left wheel FL and the rear right wheel RR. The wheel cylinders 40 are provided on the respective wheels FR, FL, RR, and RL to receive the hydraulic pressure and perform braking.

The hydraulic control unit 200 may be connected to the first and second backup flow paths 251 and 252. For example, the first hydraulic circuit 201 may be connected to the first backup flow path 251 to be supplied with the hydraulic pressure from the master cylinder 20, and the second hydraulic circuit 202 may be connected to the second backup flow path 252 to be supplied with the hydraulic pressure from the master cylinder 20.

Reference numerals "PS11" and "PS12," which are not described, are hydraulic flow path pressure sensors that sense the hydraulic pressure of the first and second hydraulic circuits 201 and 202, and reference numeral "PS2" is a backup flow path pressure sensor that measures the oil pressure of the master cylinder 20. In addition, reference numeral "MPS" is a motor position sensor that measures a degree of a rotation of the motor such as the rotation angle the motor 120, and reference numerals "MOS" is a motor current sensor that measures the current of the motor 120.

Hereinafter the operation of the electronic brake system 1 according to an embodiment of the present disclosure will be described in detail.

When the braking is started by the driver, the amount of brake demand of the driver can be sensed through the pedal displacement sensor 11 based on information such as the pressure of the brake pedal 10 pressed by the driver. The electronic control unit 2000 receives the electrical signal output from the pedal displacement sensor 11 and drives the motor 120.

Further, the electronic control unit may receive the magnitude of a regenerative braking amount through the backup flow path pressure sensor PS2 provided at an outlet side of the master cylinder 20 and the hydraulic flow path pressure sensor PS1 provided in the second hydraulic circuit 202, and may calculate the magnitude of a friction braking amount in accordance with the difference between the demanded braking amount of the driver and the regenerative braking amount, thereby identifying the magnitude of a pressure increase or a pressure decrease of the wheel cylinders 40.

Figure 2:
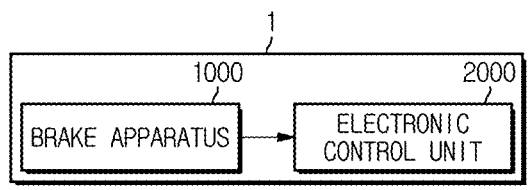
FIG. 2 is a block diagram illustrating the electronic brake system according to the embodiment of the present disclosure.

Next, FIG. 2 is an inner block diagram of the electronic brake system 1 according to the embodiment of present disclosure which includes the electronic control unit 2000 that connected to the brake device 1000 in the electronic brake system 1 and FIG. 3 is a detailed block diagram.

Referring to FIG. 3, the electronic control unit 2000 of the electronic brake system 1 according to an embodiment of the present disclosure includes an input unit 102, a determination unit 104, and a controller 108.

The input unit 102 receives sensing values from a motor position sensor MPS and a motor current sensor MCS, a pedal displacement sensor 10 and a plurality of pressure sensors PS of the brake device 1000.

However, the various sensors and valves in the brake device 1000 shown in FIG. 3 are not limited thereto, and thus all the components constituting the circuit such as various sensors of the brake circuit and the valve 203 constituting the electronic brake system of FIG. 1 may be applicable.

Therefore, the brake device 1000 may be an Integrated Dynamic Brake (IDB) generating boosting pressure and braking pressure by the single motor 120, and may be any braking means for generating the braking pressure by the motor. That is, the electronic brake system 1 shown in FIG. 1 may be applied.

For example, the input unit 102 may measure the pressure on the pedal of the user based on the sensed value of the pedal displacement sensor 11.

In addition, for example, the input unit 121 may check the rotation angle of the motor and the amount of current applied to the motor from the motor position sensor MPS and the motor current sensor MCS.

In addition, the pressure sensor PS may confirm the pressure value of the circuit from all the pressure sensors included in the circuit constituting the electronic brake system 1 shown in FIG. 2. For example, the hydraulic pressure of the first hydraulic circuit 201 may be input from the PS 11, the hydraulic pressure of the second hydraulic circuit 202 may be input from the PS 12, and the pressure of the simulation apparatus 50 may be input from the PS 2.

Next, the determination unit 104 determines whether or not the pedal simulator valve 54 is abnormal. Specifically, when the detected pedal simulator pressure is equal to or higher than set pressure, the determination unit 104 determines that the simulator valve 54 is not opened.

In particular, when the detected pedal simulator pressure is equal to or higher than the set pressure, the determination unit 104 calculates target pressure of the driver's braking intention. When the pressure of the pedal simulator is greater than the target pressure of the driver's braking intention, the simulation valve 54 may be determined as not yet opened.

That is, when the pressure of the pedal simulator is greater than the target pressure of the driver's braking intention, the determination unit 104 detects the pressure of the main flow path. When the pressure of the pedal simulator is greater than the pressure of the detected main flow path, the determination unit 104 may determine that the simulation valve 54 is not opened.

According to an embodiment, the determination unit 104 may determine that the simulation valve 54 is not opened when the pressure of the pedal simulator is greater than the pressure of the detected main flow path for a predetermined time or more.

Therefore, when the determination unit 104 determines that the simulation valve 54 has failed, the determination unit 104 transmits a failure signal of the simulation valve 54 to the controller 108 so that the controller 108 controls the cut valves 261 and 262 to generate a pedal feeling that matches the pedal pressure applied by the driver.

Accordingly, when the controller 108 determines that the simulation valve 54 has failed, the controller 108 closes the cut valves 261 and 262 to generate a pedal feeling that matches the pedal pressure applied by the driver.

Thereafter, with the cut valves 261 and 262 closed, the controller 108 calculates the target pressure from the pedal simulator pressure. At this time, the method of calculating the target pressure may be calculated according to a target pressure curve that is tuned in advance according to the pedal simulator pressure, and the controller 108 may further allow the calculated target pressure to pass through a low pass filter (LPF) to remove the noise generated.

In another embodiment, when the controller 108 determines that the simulation valve 54 has failed, the controller 108 may periodically open the cut valve to induce the pedal to be drawn. For example, when the controller 108 determines that the simulation valve 54 has failed, the controller 108 may close the cut valves 261 and 262 immediately, and open the cut valves 261 and 262 once every 500 ms for about 10 ms so that the pedal may be applied when the user steps on the pedal.

However, when the controller 108 determines that a malfunction has occurred additionally in addition to the failure of the simulation valve 54 in the electronic brake system 1, the controller 108 enters the fallback mode. That is, when entering the fallback mode, the controller 108 may open the cut valves 261 and 262, and thus the hydraulic pressure may be directly transmitted to the hydraulic circuit 200 from the master cylinder 20.

Figure 4A:
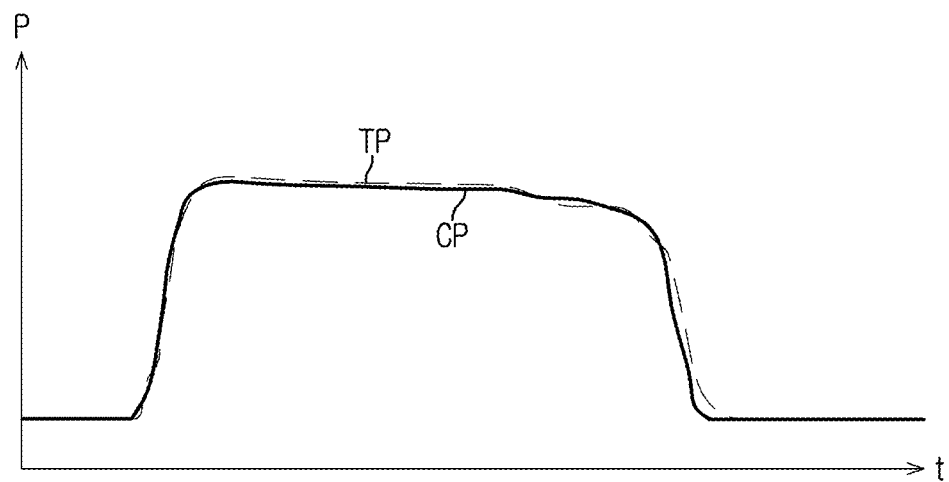
FIG. 4A is a graph illustrating a pedal displacement, simulator pressure, target pressure, and circuit pressure during a normal operation of a pedal simulator.

FIG. 4A is a graph illustrating the pedal displacement and the simulator pressure, the target pressure, and the circuit pressure when the pedal simulator is in normal operation, and FIGS. 4B and 4C are graphs illustrating the pedal displacement and the simulator pressure, target pressure, and circuit pressure when the simulation apparatus according to an embodiment of the present disclosure fails.

Figure 4A:
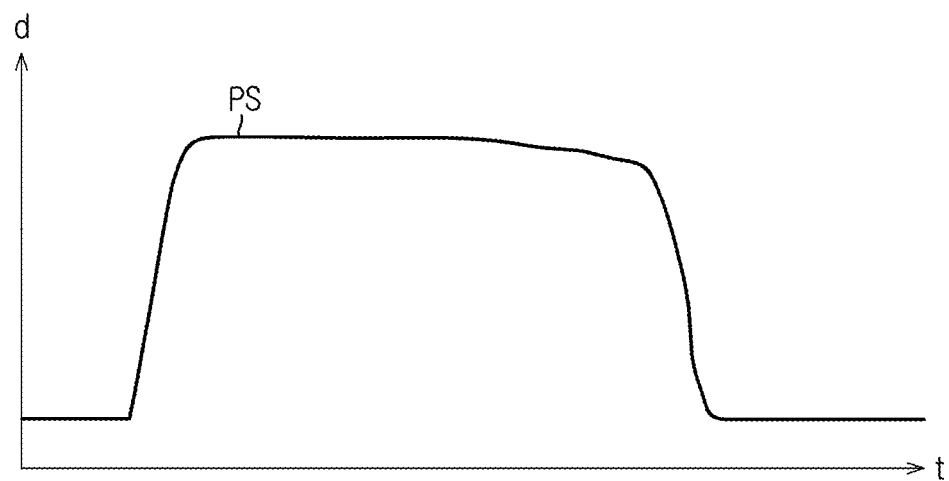

First, the graphs illustrated in FIG. 4 includes the pedal simulator pressure PSP, the target pressure PSP_TP calculated based on the pedal simulator pressure, the pedal displacement PS measured from the pedal displacement sensor 11, the target pressure TP calculated according to the pedal displacement, the circuit pressure CP based on the pedal displacement, and the expected target pressure PSP_TP based on the pedal simulator pressure.

First, FIG. 4A shows the target pressure TP calculated according to the pedal displacement PS and the pedal displacement PS when the pedal simulator 50 is normal, and the circuit pressure CP controlled by the target pressure TP in accordance with the pedal displacement PS is shown.

As shown in the figure, when the pedal simulator is normal, it can be seen that the target pressure graph TP calculated in accordance with the pedal displacement and the circuit pressure CP operate similarly.

Next, FIGS. 4B and 4C show an operation example when the pedal simulator valve 54 in the pedal simulator 50 is in the failure state that the pedal simulator valve 54 is not opened.

FIG. 4B is a graph showing how the cut valve is controlled in a periodic opening and closing operation in the event of a pedal simulator failure.

Specifically, it can be seen that the pedal displacement PS increases stepwise as the cut valve is periodically opened and closed. Therefore, the target pressure TP is set based on the pedal displacement PS, and the circuit pressure CP is intermittently increased based on the set target pressure.

In FIG. 4C when the pedal simulator valve 54 is not opened, the pedal displacement PS, the pedal simulator pressure PSP, the target pressure PSP_TP calculated from the pedal simulator pressure, and the controlled circuit pressure PSP_CP based on the pedal simulator pressure is shown.

In the case of FIG. 4C, unlike FIG. 4B, no intermittent pedal feeling is generated, and after the pedal enters a certain distance, it no longer enters, and circuit pressure may be generated according to the pedal simulator pressure instead of the pedal displacement.

The configuration of the electronic brake system 1 according to the present disclosure has been described above.

Figure 5:
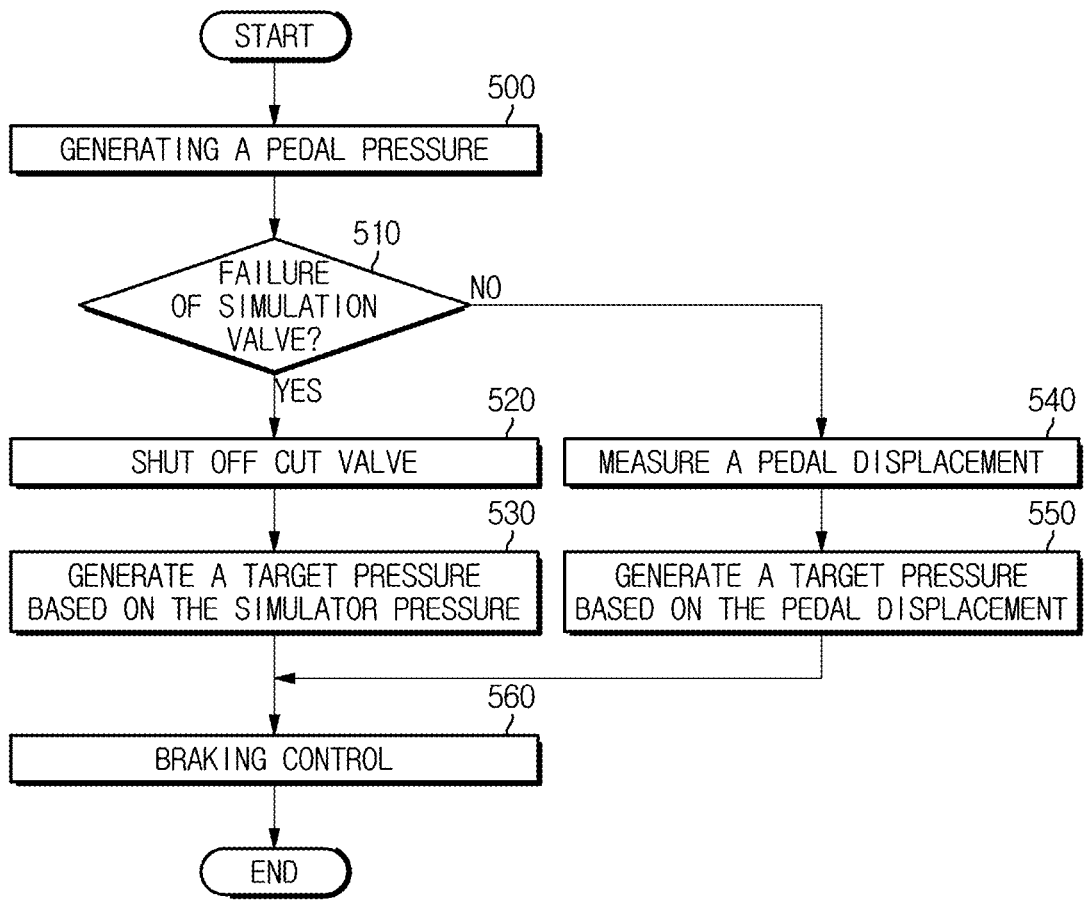
FIG. 5 is a flowchart illustrating the electronic brake control method according to the embodiment of the present disclosure.

Hereinafter a control method of the electronic brake system 1 according to the present disclosure will be described. FIG. 5 is a flowchart showing a control method of the electronic brake system 1 according to the embodiment.

First, the present disclosure starts when a pedal is applied (500). When the pedal is applied and the determination unit 104 determines that the simulation valve 54 has failed (YES in 510), the cut valve is closed (520). However, when the determination unit 104 determines that the simulation valve 54 has operated normally (YES in 510), the controller 108 may calculate the target pressure according to the measured pedal displacement (540 and 550).

Alternatively, when the determination unit 104 determines that the simulation valve 54 has failed (YES in 510), the controller 108 calculates target pressure according to the simulator pressure (530). At this time, the controller 108 may calculate the target pressure by applying a predetermined map according to the simulator pressure.

Therefore, the controller 108 performs the braking control according to the target pressure (560).

As is apparent from the above description, the electronic brake system may generate brake force in response to a driver's braking intention when a pedal simulator valve fails.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic brake system comprising:
a master cylinder configured to discharge oil according to displacement of a brake pedal;
a pedal displacement sensor configured to sense brake pedal displacement;
a simulation apparatus configured to provide pedal pressure responsive to the sensed pedal displacement;
a hydraulic pressure supply unit configured to generate hydraulic pressure using a motor operating based on the sensed pedal displacement;
a hydraulic circuit configured to supply the hydraulic pressure generated from the hydraulic pressure supply unit to a caliper;
a cut valve positioned between the master cylinder and the hydraulic circuit and configured to transmit or block the hydraulic pressure discharged from the master cylinder; and
a controller configured to block at least one of the cut valve and configured to perform braking control with target pressure according to pressure in the simulation apparatus when the simulation apparatus fails.

2. The electronic brake system according to claim 1, the simulation apparatus further comprises
a simulation chamber configured to store oil discharged from the master cylinder; and a simulator valve configured to regulate the hydraulic pressure delivered to the simulation chamber.

3. The electronic brake system according to claim 2, further comprising:
a simulator pressure sensor configured to measure pressure of the simulation apparatus; and
wherein
the controller calculates target pressure based on the pressure in the simulation chamber sensed by the simulator pressure sensor and generates hydraulic pressure based on the target pressure when the simulator valve is determined to fail.

4. The electronic brake system according to claim 3, wherein
the controller blocks the cut valve when a failure in the electronic brake system is a failure of the simulator valve.

5. The electronic brake system according to claim 4, wherein
the controller enters a fallback mode when it is determined that a failure other than the simulator valve has occurred in the electronic brake system.

6. The electronic brake system according to claim 5, wherein
the controller determines that the simulator valve fails when the hydraulic pressure in the simulator chamber is greater than first predetermined hydraulic pressure.

7. The electronic brake system according to claim 6, wherein
the controller determines that the simulator valve is not opened when the hydraulic pressure in the simulator chamber is greater than the first predetermined hydraulic pressure.

8. The electronic brake system according to claim 1, wherein
the controller periodically opens the cut valve after shutting off the cut valve when the simulation apparatus fails.

9. A method for controlling an electronic brake system comprising a simulation apparatus configured to provide a pedal pressure responsive to a pedal displacement, a hydraulic pressure supply unit configured to generate a hydraulic pressure using a motor operating based on the pedal displacement, and a hydraulic circuit configured to provide the hydraulic pressure generated from the hydraulic pressure supply unit to a caliper, the method comprising:
discharging oil according to the displacement of the brake pedal, by a master cylinder;
transmitting or blocking the hydraulic pressure discharged from the master cylinder, by a cut valve positioned between the master cylinder and the hydraulic circuit; and
blocking the cut valve and performing braking control with target pressure according to pressure in the simulation apparatus when the simulation apparatus fails.

10. The method according to claim 9, further comprising:
storing oil discharged from the master cylinder, by the simulation apparatus; and
adjusting the hydraulic pressure transferred to the simulation chamber, by the simulator valve in the simulation apparatus.

11. The method according to claim 9, further comprising:
calculating target pressure based on the hydraulic pressure in the simulation chamber when the simulator valve is determined to fail; and
generating hydraulic pressure based on the target pressure.

12. The method according to claim 11, wherein calculating target pressure based on the hydraulic pressure in the simulation chamber when the simulator valve is determined to fail comprises determining that the simulator valve fails when the hydraulic pressure in the simulator chamber is greater than first predetermined hydraulic pressure.

13. The method according to claim 12, wherein determining that the simulator valve fails when the hydraulic pressure in the simulator chamber is greater than first predetermined hydraulic pressure comprises determining that the simulator valve is not opened when the hydraulic pressure in the simulator chamber is greater than the first predetermined hydraulic pressure.

14. The method according to claim 11 further comprising:
shutting off the cut valve when a failure in the electronic brake system is a failure of the simulator valve; and
entering a fallback mode when it is determined that a failure other than the simulator valve has occurred in the electronic brake system.

15. The method according to claim 9 further comprising:
periodically opening the cut valve after shutting off the cut valve when the simulation apparatus fails.

* * * * *